Aug. 19, 1969 A. MILEWSKI 3,462,743

PATH FINDING APPARATUS FOR SWITCHING NETWORK

Filed Dec. 29, 1966 6 Sheets-Sheet 1

PATH FINDING APPARATUS FOR SWITCHING NETWORK

Filed Dec. 29, 1966 6 Sheets-Sheet 3

Aug. 19, 1969 A. MILEWSKI 3,462,743

PATH FINDING APPARATUS FOR SWITCHING NETWORK

Filed Dec. 29, 1966 6 Sheets-Sheet 4

United States Patent Office 3,462,743
Patented Aug. 19, 1969

3,462,743

PATH FINDING APPARATUS FOR SWITCHING NETWORK

Andrzej Milewski, St. Jeanuet, France, assignor to International Business Machines Corporation, Armonk, N.Y., a corporation of New York Filed Dec. 29, 1966, Ser. No. 605,756
Claims priority, application France, Jan. 4, 1966, 7,716 AM
Int. Cl. G11b *13/00;* G06f *7/00, 15/00*
U.S. Cl. 340—172.5 5 Claims

ABSTRACT OF THE DISCLOSURE

An address register including a plurality of orders for storing a tentative address routing between two matrices in a plurality of stages of matrices with sensing means responsive to the respective orders of the register to establish whether links between matrices so designated are busy or idle and control apparatus responsive to the output from the sensing apparatus for modifying the address to indicate a free path.

The invention relates to apparatus for free path finding within a switching network of the plural matrix stage type currently found in telephony and specifically to finding a free path between subscribers within a branch exchange.

Heretofore, such inquiry called for a reitrated scanning of the status of those links, either by testing them directly in the network itself, or by testing an "image network" duplicating at all times all of the network element status. The method used was generally involved, often lengthy and the circuits and devices used therewith were quite complicated, bringing about in some cases disturbances into the voice circuit.

The present invention is directed to apparatus for receiving the logical address designation of the matrices to which the subscribers are directly connected and for providing tentative address designations of matrices in all higher order stages necessary to establish a connection. The links between matrices for each subscriber are then tested concurrently beginning with the connection between the matrix immediate to each subscriber and extending to the assumed matrix in the next higher order stage. If both links are free, the tentative address designation for the matrices in that stage are assumed correct and the apparatus cycles to test the links to the next matrices. If either tentative link is busy, other links to other matrices of the instant stage are examined to find free links and the tentative address assumed correct if found. If no sets of free links are found for that stage, the apparatus recycles and modifies the previously established link which was assumed correct to determine the addresses of a further pair of free links. The next succeeding stage is again tested and the operation continues.

Accordingly one of the objects of the invention is to provide an apparatus for free path finding within a switching network between a given incoming line and an arbitrary output line.

A further object still of the invention is to provide an apparatus which does not require protection circuits which in prior art systems kept busy switches from being marked.

Another object of the invention is to provide control apparatus decentralized to establish paths within large scale networks in a manner independent of the main control.

The invention has also for its object to make use of network structure for obtaining from the address of lines to be connected, the addresses of those links found through the various possible paths existing between said two lines.

The foregoing and other objects, features and advantages of the invention will be apparent from the following more particular description of a preferred embodiment of the invention, as illustrated in the accompanying drawings.

Figure 4:
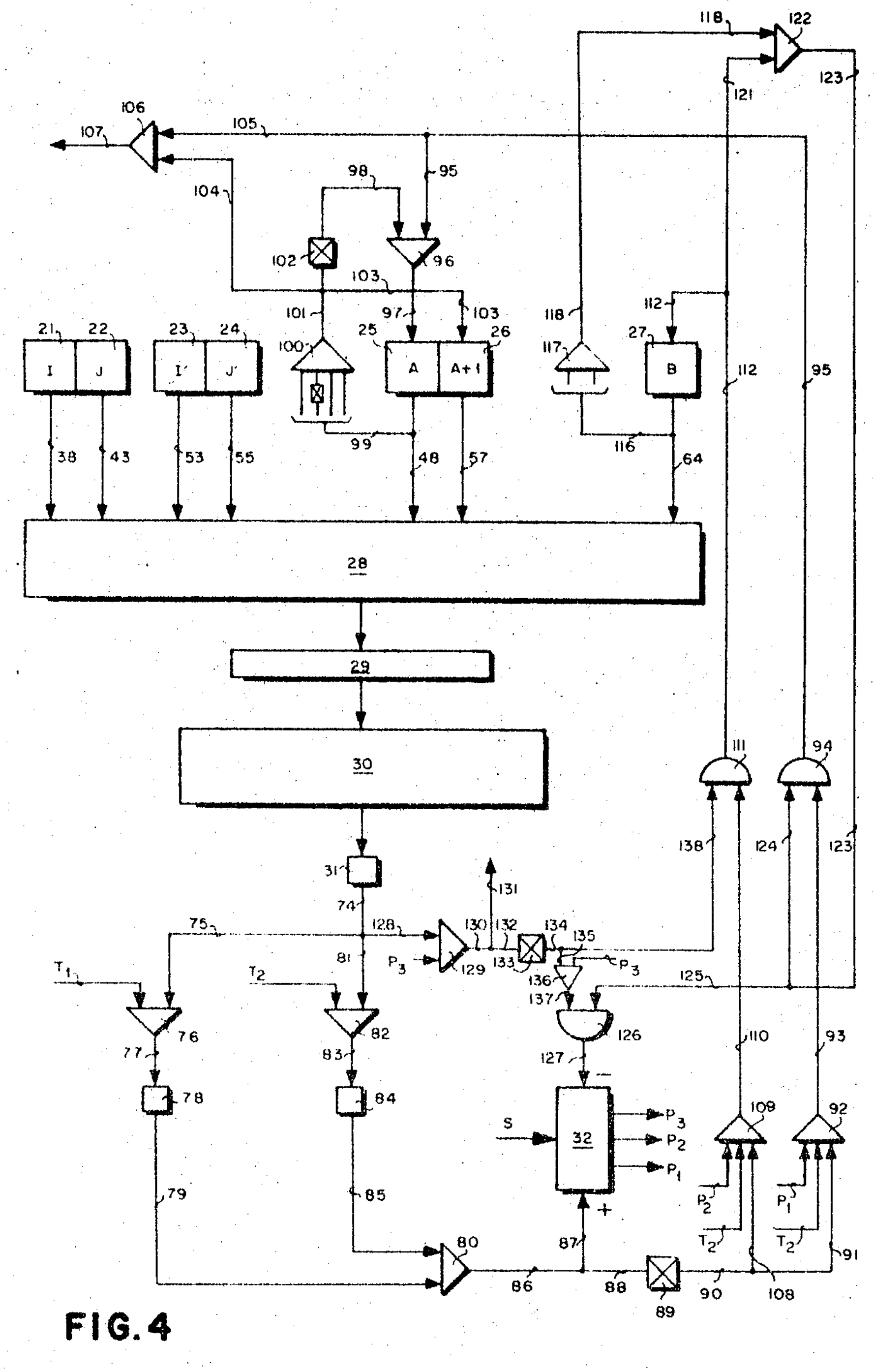
FIG. 4 is the main logic circuitry of the invention.
Figure 5:
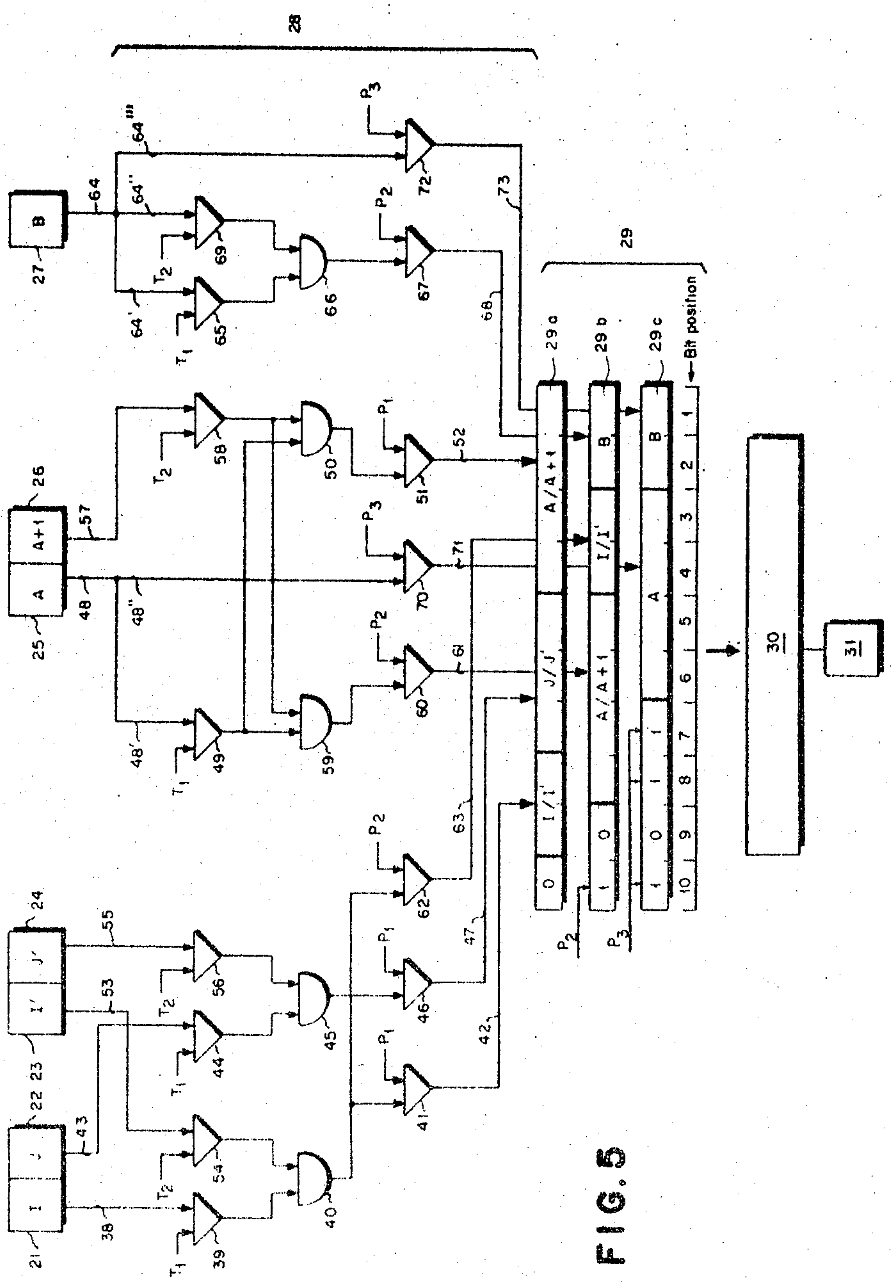
FIG. 5 shows details of logic address select circuits generally shown under 28 on FIG. 4.
Figure 6:
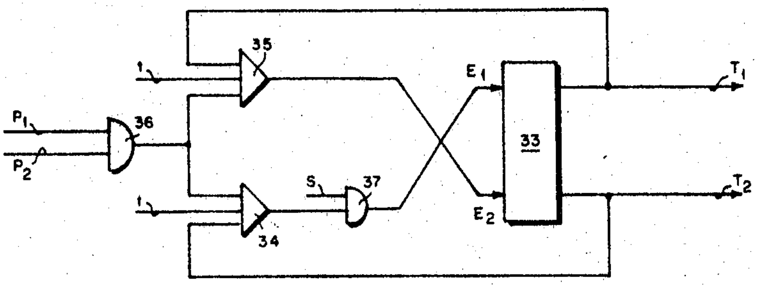
Figure 7:
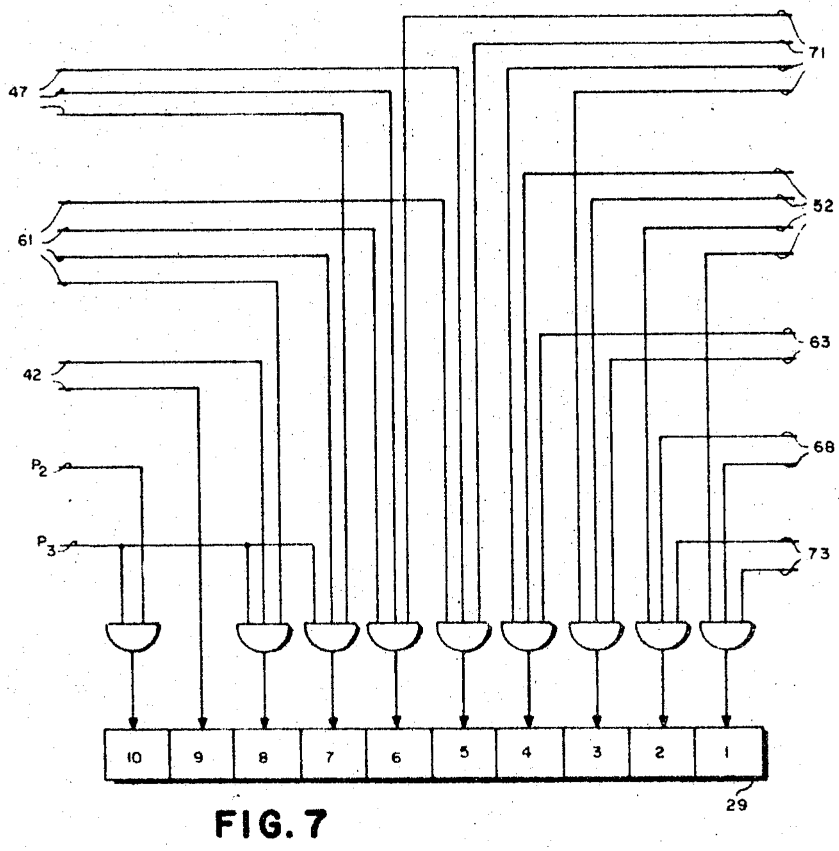
Figures 8, 9:
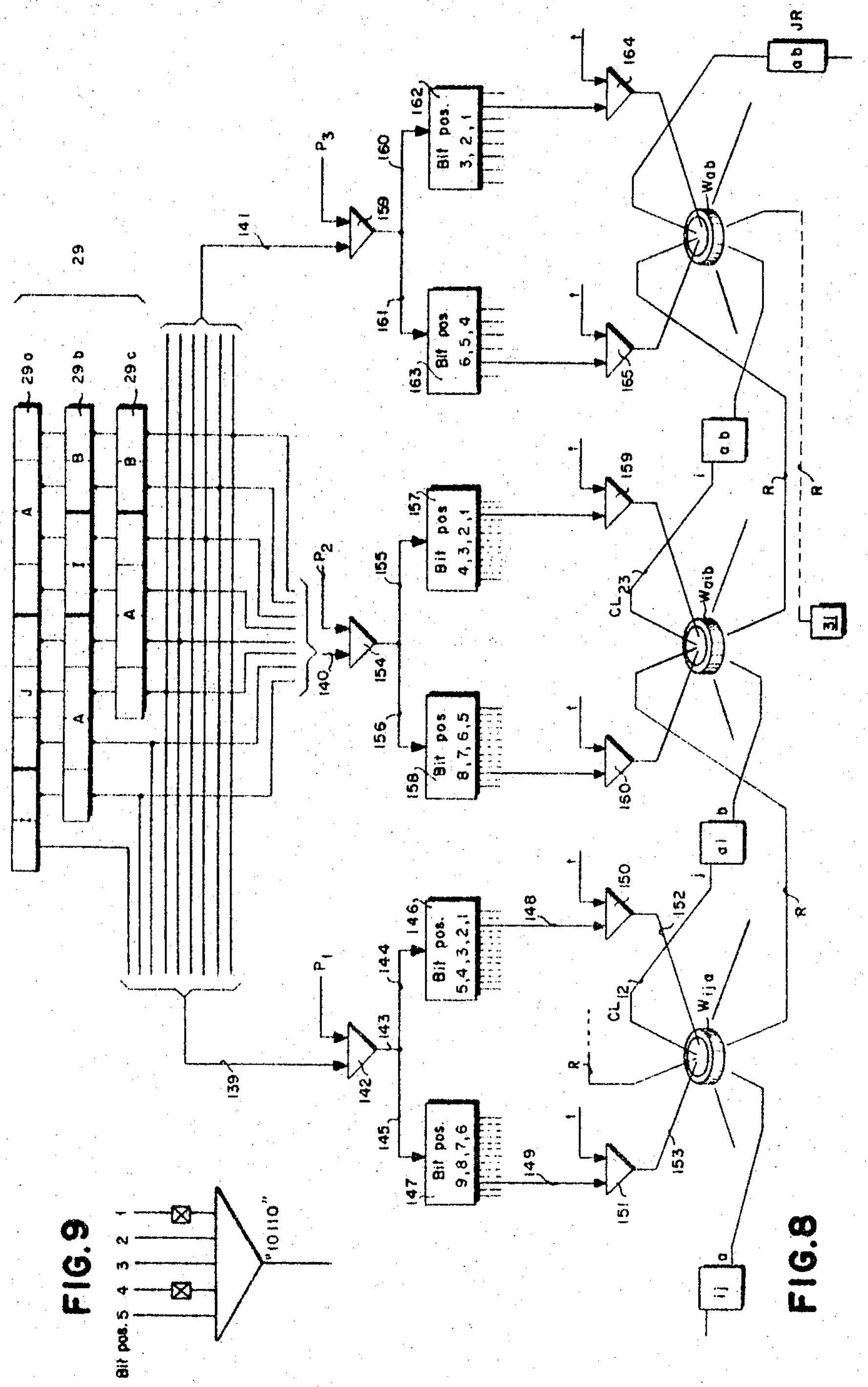

FIG. 6 discloses a timing circuit control device;

FIG. 7 shows a diagram of the input connections to register 29 of FIGS. 4 and 5;

FIG. 8 shows a particular storage organization for a device embodying the invention;

FIG. 9 shows a detail of decoder 146 disclosed on FIG. 8.

SWITCHING NETWORK DESCRIPTION

Figure 1:
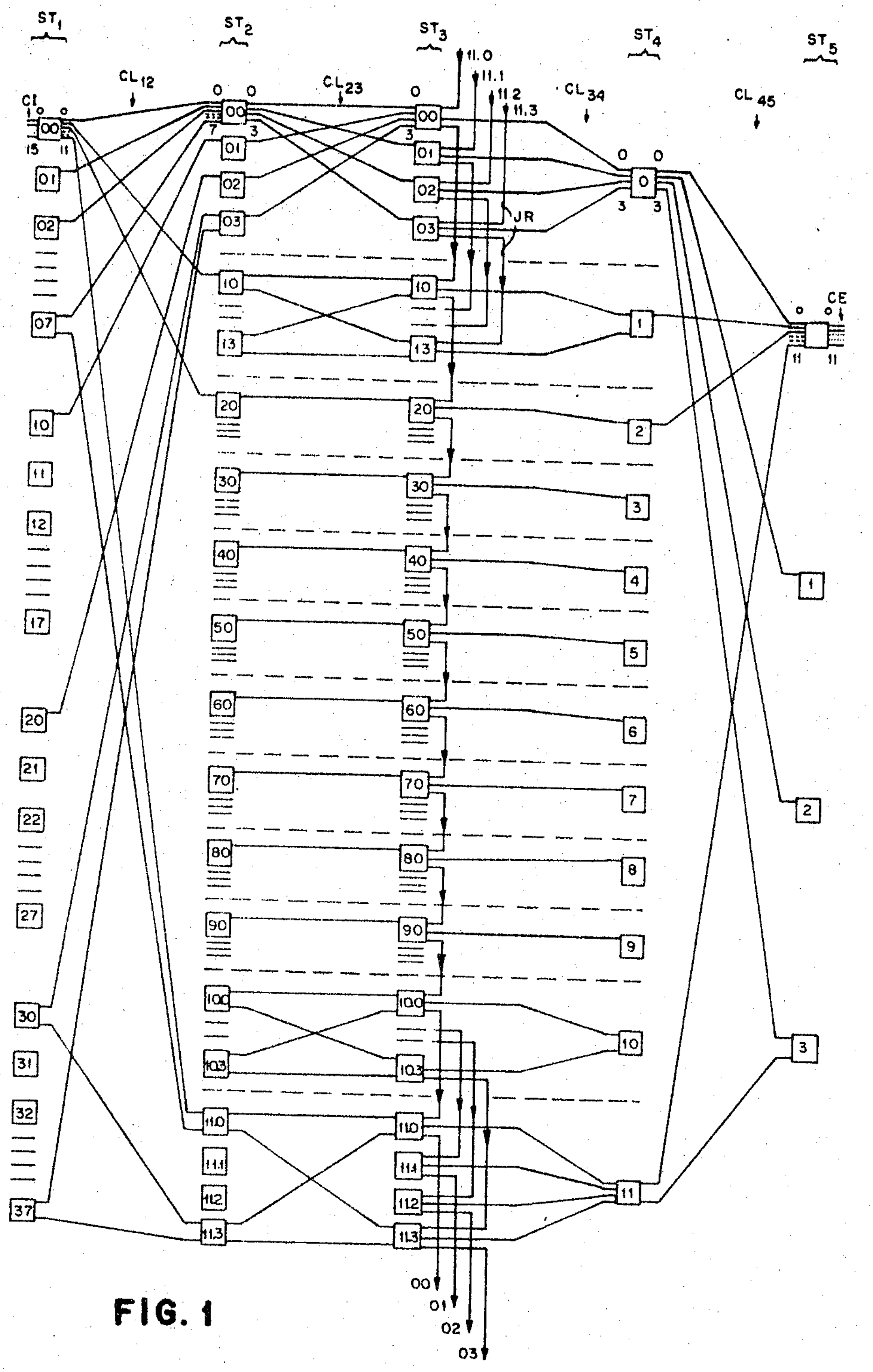
FIG. 1 shows a switching network.
Figure 2:
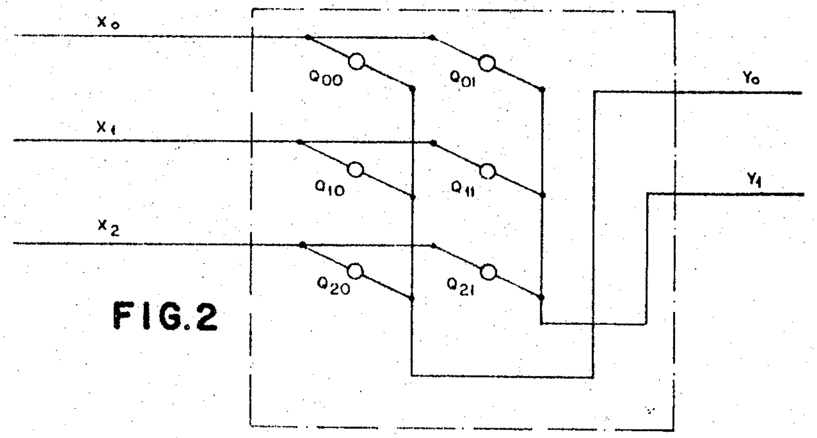
FIG. 2 illustrates details of a switching matrix.

Referring to FIG. 1 there is shown a switching network for a private branch exchange. The network basically comprises five switching matrix stages, $ST_1$, $ST_2$, $ST_3$, $ST_4$ and $ST_5$; four sets of links $CL_{12}$, $CL_{23}$, $CL_{34}$ and $CL_{45}$ extending between said successive stage matrices; lines CI referred to as subscriber lines or extensions since they correspond to telephone lines internal to the exchange; and lines referred to as "outgoing" lines or trunk lines since they stand for outgoing lines to public telephone network. Only the subscriber lines of the first matrix of the first stage have been disclosed. In FIG. 1, matrices have been drawn as blocks, and their internal configuration is conventional as may be seen on FIG. 2 wherein a three row ($X_0$, $X_1$, $X_2$) and two column lead ($Y_0$, $Y_1$) matrix is being shown. Said matrix switches $Q_{00}$, $Q_{01}$, $Q_{10}$, $Q_{11}$, $Q_{20}$ and $Q_{21}$ allow the coupling of any one of the row leads to any one of the column leads. For example, closing switch $Q_{10}$ electrically connects row lead $X_1$ to column lead $Y_0$. Obviously both column lead number and row lead number may vary depending on the stage at which said matrix is found.

It may be seen from FIG. 1 that the first stage $ST_1$ or input stage comprises thirty-two matrices divided into four groups of eight matrices, each matrix comprising sixteen row leads (that is sixteen subscriber lines or extensions per matrix, amounting to a total of 512 extensions) and twelve column leads. Each of said matrices is identified by two coordinates:

Going from left, the first coordinate stands for the matrix group rank: 0, 1, 2 or 3;

The second coordinate stands for the matrix rank into the group: 0, 1, 2 . . . 7.

Each row lead into a matrix will also be assigned a coordinate corresponding to its rank, said coordinate varying from 0 thru 15; similarly each column lead will be assigned a coordinate standing for its rank, said coordinate taking values such as 0, 1, 2 . . . 11.

From such numbering system, it may be readily seen that each lead, whether it is a column lead or a row lead, will be perfectly defined by a three coordinate address; the first two coordinate being the coordinates of the matrix to which said lead belongs to, and the third coordinate being said lead coordinate into said matrix.

The second stage $ST_2$ comprises forty-eight matrices subdivided into twelve groups of four matrices, each matrix comprising eight row leads and four column leads.

Coordinates are assigned to those matrices and leads in accordance with the same numbering principle as before; said coordinates may then take the following values:

0,1, 2 . . . 11 for the matrix group rank;

0, 1 ,2 or 3 for matrix rank into a group;

0, 1, 2 . . . 7 for the row lead rank;

0, 1, 2 or 3 for the column lead rank.

The third stage $ST_3$, or network half-way stage, comprises forty-eight matrices, just as the second stage, similarly divided into twelve groups of four matrices, each matrix comprising four row leads and three column leads. Still using the same numbering system, the various coordinates will take the following values:

0, 1, 2 . . . 11 for the matrix group rank;

0, 1, 2 or 3 for matrix rank into a group;

0, 1, 2 or 3 for the row lead rank.

For reasons to be apparent subsequently, said stage column leads will not be assigned coordinates. The network fourth stage $ST_4$ comprises twelve matrices the addresses of which are single coordinate addresses, said coordinate taking values 0, 1, 2 . . . 11. Each of said matrices comprises four row leads and four column leads which may take values 0, 1, 2 or 3.

The fifth stage $ST_5$ will only hold four matrices whose addresses are single coordinate ones, which may take values 0, 1, 2 or 3. Each of said matrices comprises twelve row leads and twelve column leads which may take values 0, 1, 2 . . . 11.

Figure 3:
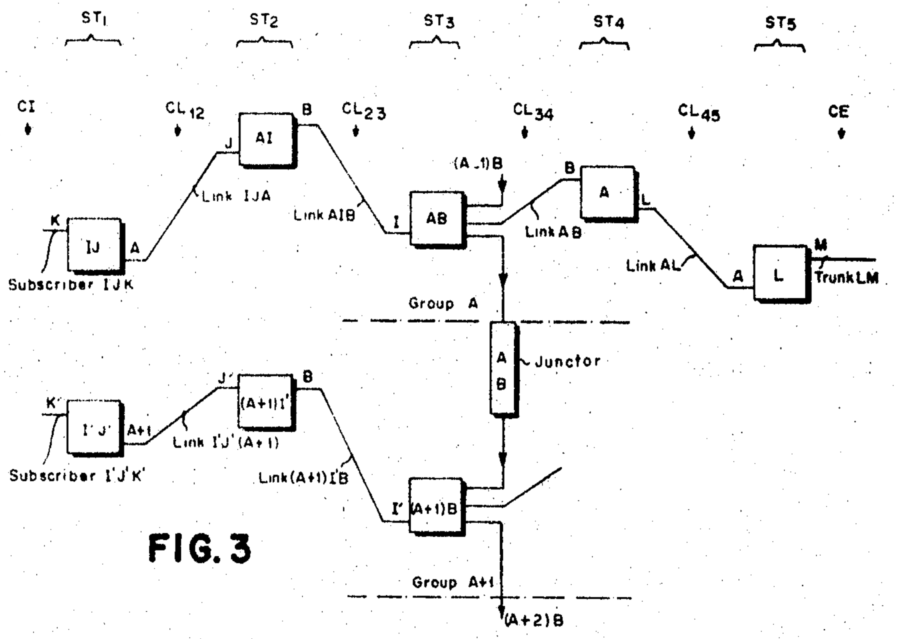
FIG. 3 illustrates the interconnection law between elements of the network of FIG. 1.

In order to readily define the laws according to which those links, extending between the various stage matrices, link said matrices, let I and J stand for the respective coordinates of any matrix of the first stage, A and B those of an halfway stage matrix, and L the coordinate of a matrix belonging to the fifth and last stage. The connection laws as schematically disclosed in FIG. 3 are as follows:

The column lead of coordinate A coming out of first stage matrix IJ is coupled to that row lead of coordinate J getting in matrix AI of the second stage;

That column lead of coordinate B coming out of matrix AI of stage two is coupled to that row lead of coordinate I getting into matrix AB of stage three;

One of the column lead getting out of matrix AB of stage three (for the purpose of clarifying ideas that particular lead is going to be called lead "number one") is coupled to that row lead of coordinate B getting into matrix A of stage four. Since that lead going from stage AB on to the next stage is unique, it becomes apparent that such lead does not need any coordinate attached to it;

The row lead of coordinate L coming out of that matrix of stage four is coupled to the row lead of coordinate A coming into matrix L of stage five.

Furthermore, should K be the coordinate of that row lead coming into matrix IJ of stage one and M the coordinate of that column lead coming out of matrix L, it will be readily seen that such coordinate system defines:

The address of a subscriber line via the set of coordinates IJK;

The address of a trunk line via the set of coordinates LM;

The address of a link from the first link from the first link set ($CL_{12}$) via the set of coordinates IJA;

The address of a link from the second link set ($CL_{23}$) via the set of coordinates AIB;

The address of a link from the third link set ($CL_{34}$) via the set of coordinates AB; The address of a link from the fourth link set ($CL_{45}$) via the set of coordinates AL.

From the above, it should be readily seen, that there will be in such network only one path between a given subscriber line and a given half-way matrix, as well as one path from a half-way matrix to a trunk or outgoing line. In effect, addresses IJK and AB of a subscriber line and half-way matrix will obviously define all parameters of the one path connecting them. The same applies for addresses AB and LM. For finding a free path between some given subscriber line IJK and some further outgoing line LM, it is necessary to find a half-way matrix AB for the unique path defined by the set of coordinates IJK, AB, LM to be free.

A further characteristic of this network is that from second to fourth stage, coupling between stages are only via matrices belonging to the same group (i.e., those matrices having like first coordinate A). However, connections between groups do happen, but they are solely intended to realize connections between any two subscriber lines. These connections are obtained via the half-way matrix column lead "number two" and "number three" in accordance with the following law. Column lead number two of a given half-way matrix of address AB is coupled via a junctor which address will also be AB, to column lead number three of the half-way matrix of address $(A+1)B$, it being understood that for $A=11$ (maximum value of A in this herein example) $A+1$ becomes zero. Such couplings will be unidirectional in the direction of increasing values of A (arrow direction on FIGS. 1 and 3) owing to junctor unidirectional character. Hereinafter said junctors will only be described as unidirectional switches, the other ordinary functions (ringer control, ring back signals, tones, etc) not aiding in the understanding of the invention.

Turning to FIG. 3, it is shown how it is possible to connect, via junctor of address AB, two subscriber lines of respective addresses IJK and I'J'K'. The path goes in succession through matrices IJ of stage one, AI of stage two, AB of stage three, junctor AB, and matrices $(A+1)B$ of stage three, $(A+1)I'$ of stage two and finally I'J' of stage one.

Still referring to FIG. 3, it may be readily seen, from the foregoing that the necessary and sufficient condition, for establishing connection between two subscribers of respective addresses IJK and I'J'K' is to find a junctor of address AB such that those paths from lead IJK to half-way matrix AB on one hand, and from lead I'J'K' to matrix $(A+1)B$ on the other hand are free.

Hereinafter, only connections between two extensions will be considered, since free path finding between subscriber line and outgoing line or trunk may be obtained through a process and device similarly to those about to be described, but simpler and derived therefrom in a manner which is obvious.

A device and method for finding a free path in a switching path between a calling subscriber and a junctor and between a second subscriber and this junctor is disclosed and claimed in an application, entitled Free Path Finding Device and Process Into a Switching Network, filed by M. B. Bastian and F. B. Bohy on July 11, 1966, Ser. No. 564,121

PATH FINDING PROCESS DEFINITION

In order to find out within the switching network just described, a free path between two subscribers of respective addresses IJK and I'J'K', the following steps are performed All link pairs belonging to the $CL_{12}$ link set will be considered in succession, each of said pairs corresponding to two links of respective addresses IJA and $I'J'(A+1)$, with A increasing progressively from A=0, until a pair of two free links is found. If after going through all values of A up to the highest one ($A=11$ in the example) no free pair has been found, there will not be a free path. If a free pair is found before reaching the maximum value of A, then said pair will define some value for A, say $A_n$;

All link pairs belonging to the $CL_{23}$ link set will then be considered. Each of these pairs correspond to two links of respective addresses $A_nIB$ and $(A_n+1)I'B$ with B increasing progressively from $B=0$, until a pair of two free links is found. If no free pair is found upon reaching the maximum value of B ($B=3$ in the example), step one is repeated, taking for A the value $A_n+1$ and for B the value zero. If a pair is found, then said pair will define some value of B, say $B_p$, $A_n$ and $B_p$ will then define a junctor.

Junctor $A_nB_p$ is then considered. If it is idle, then a free path has been found between leads IJK and I'J'K'. If it is not free, then the second step is repeated using $B_p+1$. If at some particular time during search, the last junctor ($AB=11.3$ in the herein example) is considered and this junctor is not free, then no free path will ever be found.

PATH FINDING DEVICE DESCRIPTION
(FIGS. 4 and 5 particularly)

Most of the logic circuits of FIGS. 4 and 5 are shown with single line connection so as not to obscure the invention, and it should be understood that the number of lines are determined by reference to the logic and to the data to be transferred.

The following logic symbols have been used throughout the figures:

Inverters are shown as squares with diagonals;
Logic gates acting as AND's are shown as isoceles triangles;
Logic gates acting as OR's are shown as arcs of circles bounded through their subtense.

The main elements shown in FIG. 4 are seven coordinate registers numbered 21 thru 27, address selection logic circuits generally shown under 28, a storage addressing register 29, a link storage memory 30, a read register (eventually write) 31, and finally data processing logic circuits (shown in detail in FIG. 5).

Registers 21 and 22 receive respectively coordinates I and J of that address IJK of a calling subscriber; registers 23 and 24 receive coordinates I'J' of that address I'J'K' of the called subscriber.

Register 25 is a binary counter which is set to zero at the beginning of any search. It is incremented in the search as needed. Register 26 is connected to register 25 so that its contents are always that of register 25 increased by one.

Register 27 is a binary counter, initially set to zero, whose contents are incremented by one each time it receives a pulse.

All o fthese registers are multiposition registers suitable for storing the coordinates of the respective subscribers. For example:

Registers 21 and 23 contain two bit positions (since the maximum decimal value of I is "3," that is "11" in binary form);

Registers 22 and 24 contain three bit positions (the maximum values of J being "7," that is "111" in binary form);

Registers 25 and 26 contain four bit positions (the maximum decimal value of A and $A+1$ is "11," that is "1011" in binary form);

Register 27 contains two bit positions (the maximum decimal value of B is "3").

Each of those seven registers are coupled to logic circuits 28, the latter circuits being intended to sequentially read out: addresses IJA and $I'J'(A+1)$; then AIB and $(A+1)I'B$; and finally AB corresponding to the above mentioned three process phases. This selection process is timed as follows:

IJA at time $T_1$ of phase $P_1$,
$I'J'(A+1)$ at time $T_2$ of phase $P_1$,
AIB at time $T_1$ of phase $P_2$,
$(A+1)I'B$ at time $T_2$ of phase $P_2$,
AB during phase $P_3$.

A reversible counter 32 (see FIG. 4) upon the end of each phase and from the logic data precessing circuits is counted up or down pulses in accordance with the preceding phase result. Said counter comprises three outputs $P_1$, $P_2$ and $P_3$, the outputs being respectively determined by the bit values "01," "10" and "11" of the counter contents. Whenever reset, said counter is reset to zero (in which case none of the above three circuits is fed) and goes to value "01" upon receiving a signal from a circuit S, controlling search initiation.

For the timed output $T_1$ and $T_2$ there is in FIG. 6 a circuit for originating the same. A latch 33 has two outputs respectively labeled circuits $T_1$ and $T_2$ and is controlled via two input circuits $E_1$ and $E_2$ so that whenever a pulse is applied to $E_1$, $T_1$ is excited and $T_2$ cut off. The opposite occurs whenever a pulse is applied to $E_2$. Successive feeding of circuits $E_1$ and $E_2$ is by AND circuits 34 and 35 each having three inputs applied thereto.

The first input to each of those gates is from OR gate 36 whose two inputs are $P_1$ and $P_2$.

The second input to each of said gates is excited with clock pulses *t*.

The third input to gate 34 is from a feedback circuit from $T_2$, while the third input to gate 35 is from a feedback from circuit $T_1$.

The output from gate 34 is applied to input $E_1$ of latch 33 via an OR gate 37 whose second input S controls the initiation of a search as well as clock start.

After the device of FIG. 6 has been made operative by circuit S, gates 34 and 35 will be enabled sequentially upon each clock pulse as long as there is an input at $P_1$ or $P_2$, so that $T_1$ and $T_2$ will be in turn excited, each for a time corresponding to the time interval between two consecutive clock pulses.

Logic circuitry 28 is shown particularly in FIG. 5.

In order to emphasize the information held in register 29 during each of said three phases $P_1$, $P_2$, and $P_3$, the register has been conveniently shown as three registers **29*a*, 29*b*, 29*c***, which are linked to the logic circuitry in accordance with phase time during which said circuitry is active. It should be understood that such representation is only symbolic and intended to aid in the understanding only.

Storage 30, which may be of any (non-permanent) type, comprises at least as many elements as there are possible addresses of the types IJA, AIB and AB, i.e. "384+192+48=624." Actually said storage 30 will contain more than 624 elements. The address for IJA in binary must include "111111011," that is "507" in the decimal system, because the coordinate A may only take twelve distinct values, while the four available binary order would allow sixteen combinations. The addresses of AIB and AB in decimal numbers go from "0" to "191" for the first, and from "0" to "47" for the second. It is necessary to add to all addresses of type AIB a constant number at least equal to "508" and to all addresses of type AB a number at least 192 units higher than the previously chosen number. This determines the binary number to be 10 digits in length.

The addresses may be readily obtained by circuits $P_2$ and $P_3$ as may be seen from FIG. 5:

Circuit $P_2$ enters a binary arc into the tenth order of register 29 which will then hold a "1" throughout phase $P_2$. All addresses transferred into said register during said phase (and which only use the first eight orders) will then be incremented by 512;

Circuit $P_3$ simultaneously exicites orders 7, 8 and 10 of register 29. These orders will hold "1's" throughout phase $P_3$ and all addresses transferred into said register during said phase (and which only use the first six orders) will then be incremented by 704 unit.

The sequential transfer of the various addresses is accomplished by the following circuits, see particularly FIG. 5.

Transfer of address IJA (phase $P_1$, time $T_1$):

The output circuit 38 from register 21 (coordinate I) conditions succession, AND gate 39 whose second input is circuit $T_1$, OR gate 40, and AND gate 41 whose second input is circuit $P_1$.

The output circuit 43 from register 22 (coordinate J) conditions in succession an AND gate 44 whose second input is circuit $T_1$, and OR gate 45, and an AND gate 46 whose second input is circuit $P_1$. The output 47 from the latter gate will then deliver information J at time $T_1$ of the first phase. The information is inserted into binary positions 5, 6 and 7 of register **29*a***.

A first branch 48' of output circuit 48 of register 25 (coordinate A) conditions in succession an AND gate 49 whose second input is circuit $T_1$, an OR gate 50, and an AND gate 51 whose second input is circuit $P_1$. The output circuit 52 from the latter gate will then deliver information A at time $T_1$ of phase $P_1$. Said information is introduced into binary position 1, 2, 3, and 4 of register 29*a*.

Transfer of address $I'J'(A+1)$ (phase $P_1$, time $T_2$):

The output circuit 53 from register 23 (coordinate I') conditions in succession an AND gate 54 whose second input is circuit $T_2$, the OR gate 40 and the AND gate 41. The output circuit 42 from said latter gate will then deliver information I' at time $T_2$ of phase $P_1$. This information is inserted into binary positions 8 and 9 of register 29*a*.

The output circuit 55 from register 24 (coordinate J') conditions in succession an AND gate 56 whose second input is circuit $T_2$, the OR gate 45 and the AND gate 46. The output circuit 47 from this gate 46 will then deliver the information J' at time $T_2$ of phase $P_1$. Said information is inserted into the binary positions 5, 6 and 7 of register 29*a*.

The output circuit 57 of register 26 (coordinate $A+1$) conditions in succession an AND gate 58, whose second input is circuit $T_2$, the OR gate 50, and the AND gate 51. The output circuit 52 from the latter gate will then deliver the information $A+1$ at the time $T_2$ of phase $P_1$. This information is introduced into binary positions 1, 2, 3 and 4 of register 29*a*.

Transfer of address AIB (phase $P_2$, time $T_1$):

The branch 48' of output circuit 48 of register 25 (coordinate A) conditions as seeen above the AND gate 49 whose second input is circuit $T_1$ other than OR gate 50, the output circuit of said gate 49 excites in succession, a second OR gate 59, an AND gate 60, whose second input is circuit $P_2$. The output circuit 61 from said latter gate will then deliver the information A at time $T_1$ of phase $P_2$. This information is introduced into the binary positions 5, 6, 7 and 8 of register 29*b*. The output circuit 38 of register 21 (coordinate I) conditions in succession, as previously discussed AND gate 39, OR gate 40. An output circuit from said gate 40 excites a second AND gate 62 whose second input is circuit $P_2$. The output circuit 63 from said later gate will then deliver the information I at time $T_1$ of phase $P_2$. This information is introduced into the binary positions 3 and 4 of register 29*b*.

A first branch 64' of output circuit 64 of register 27 (coordinate B), conditions in succession, an AND gate 65 whose second input is circuit $T_1$, an OR gate 66, and an AND gate 67 whose second input is circuit $P_2$. The output circuit 68 from said latter gate will then deliver the information B at time $T_1$ of phase $P_2$. This information is introduced into positions 1 and 2 of register 29*b*.

Transfer of address $(A+1)I'B$ (phase $P_2$, time $T_2$):

The output circuit 57 of register 26 (coordinate $A+1$) conditions the AND gate 58, whose second input is circuit $T_2$. One output of gate 58 is transferred through OR gate 59, causing the output circuit 61 of AND gate 60 to deliver the information $A+1$ at time $T_2$ of phase $P_2$. This information is introduced into the binary positions 5, 6, 7 and 8 of register 29*b*.

Output circuit 53 of register 23 (coordinate I') together with AND gate 54, OR gate 40 conditions AND gate 62. The output circuit 63 from this gate will then deliver the information I' at time $T_2$ of phase $P_2$. This information is introduced into the binary positions 3 and 4 of register 29*b*.

A second branch 64'' of the output circuit 64 of register 27 (coordinate B), is connected to an AND gate 69 whose second input is circuit $T_2$. The output of AND 69 is connected to OR gate 66. The output circuit 68 of AND gate 67 will deliver the information B at time $T_2$ of phase $P_2$. This information is introduced into the binary positions 1 and 2 of register 29*b*.

Transfer of address AB (phase $P_3$): A second branch 48'' of output circuit 48 of register 25 (coordinate A) is connected to an AND gate 70 whose second input is circuit $P_3$. The output circuit 71 from said latter gate will then deliver information A during the third phase. This information is introduced into the positions 1 and 2 of register 29*c*.

A third branch 64'' from output circuit 64 of register 27 (coordinate B) excites an AND gate 72, whose second input is circuit $P_3$. The output circuit 73 from said latter gate will then deliver the information B during the third phase. This information is introduced into positions 1 and 2 of register 29*c*.

FIG. 7 discloses a logic diagram of all the select circuits exciting the register 29. This diagram shows the actual number of connection lines OR gates are provided where there are a plurality of inputs for the same register bit position.

Referring to FIG. 4, the logic circuits for processing the information read out of storage 30 will be described.

Whenever an address has been transferred into register 29 via logic circuitry 28, the read register 31 then receives the elementary binary information "1" or "0" according to whether the circuit element corresponding to that address is busy or free. The output circuit 74 from register 31 is conditioned only if the information held therein is a "I."

Circuit 74 includes a first branch 75 conditioning an AND gate 76, whose second input is circuit $T_1$. The output circuit 77 of gate 76 is connected to a one bit position register 78. The output circuit 79 of register 78 conditions the first input of an AND gate 80.

A second branch 81 of circuit 74 conditions an AND gate 82, whose second input is circuit $T_2$. The output circuit 83 of gate 82 is connected to a one bit position register 84 The output circuit 85 from said register 84 conditions the second input of AND gate 80.

Operation of both preceding circuits is as follows. At time $T_1$ of phase $P_1$, the status of that lead of address IJA held in register 31 is transferred into register 78 via gate 76. At time $T_2$ of the same phase $P_1$, the status of that lead of address $I'J'(A+1)$ held in register 31 is transferred into register 84 via gate 82. At the end of phase $P_1$, the output 86 of AND gate 80 will be excited if both leads IJA and $I'J'(A+1)$ are free. The same holds true for times $T_1$ and $T_2$ of phase $P_2$ so that at the end of the latter phase gate 80 will provide an output if both leads AIB and $(A+1)I'B$ are free.

Circuit 86 includes a first branch 87 connected to and when there is an output from AND 80, incrementing reversible counter 32. This branch provides for transferring to the next phase when the two leads considered during the immediate phase have been found free.

A second branch 88 is taken from circuit 86 and includes a logical inverter 89. The output circuit 90 of said inverter is then excited if one, at least, of the two leads examined during the immediate phase has not been found free. In this case, it is then necessary to increment the coordinate A or B, according to the phase.

For this, a first branch 91 conditions an AND gate 92, second input is circuit $P_1$, and third input is circuit $T_2$. The output circuit 93 of said gate 92 conditions, via an OR gate 94, and a circuit 95, and AND gate 96. An output 97 of gate 96 causes the addition of one unit to the contents of register 25 (provided that said contents are different from the maximum value of A, that is "11" in decimal form). The second input to gate 96 is conditioned by a circuit 98 giving the condition "$A\neq 11$." The latter circuit is obtained by a branch 99 from the output circuit 48 of register 25. This branch actually comprises four leads (since register 25 is a four bit position register) which, when properly ANDed into an AND gate 100 (it suffices to provide an inverter on the third bit position lead, so as to form the bit combination "1011" corresponding to "11" in decimal form), which provides on the output circuit 101 of said gate 100 the condition "$A=11$."

A logic inverter 102 changes this condition into "$A \neq 11$" on circuit 98. A branch 103 from circuit 101 will condition register 26 to reset since as was seen above, $A+1$ must be zero whenever $A=11$.

A second branch 104 from circuit 101, as well as a branch 105 from circuit 95, conditions an AND gate 106, whose output circuit 107 will indicate an overflow.

A second branch 108 is also taken from circuit 90. This branch conditions an AND gate 109, whose second input is circuit $P_2$, and whose third input is circuit $T_2$. The output circuit 110 from said gate 109 provides by an OR gate 111, and a circuit 112, a one unit addition to the contents of register 27. In the case when said register contains its maximum value "3" in decimal form (that is "11" in binary form) a "1" addition will reset said register to zero since it only holds two bit positions. In that latter case it is also necessary to further detect the simultaneous occurrence of those two conditions: "Add 1 to B" and "$B=3$," since this implies a return to phase $P_1$, and a one unit addition to A. For this, a branch 116 is taken from the output circuit 64 of register 27, said branch having its two leads (since register 27 comprises two bit positions) condiitoning an AND gate 117. The output circuit 118 from said gate 117 is then conditioned by the binary combination "11" that is "3" in decimal form; said circuit 118, as well as a branch 121 circuit 112, conditions an AND gate 122. The output circuit 123 of said gate 122 will then be excited if the two previous conditions are presented simultaneously. A one unit addition to register 25 is then obtained by branch 124, circuit 123 conditions OR gate 94. Insofar as going back to phase $P_1$, this action is controlled via branch 125 from circuit 123, by OR gate 126, and by circiut 127, feeding the input "decrement" of reversible counter 32.

The output circuit 74 from register 31 comprises a third branch 128 conditioning an AND gate 129, whose second input is circuit $P_3$. The output circuit 130 of said gate 129 will then be excited during phase $P_3$ if register 31 holds a "1" during this same phase, that is if the junctor AB being examined is free. In that case, the search is ended, and a first branch 131 from circuit 130 carries a signal indicative of search end. This initiates the establishment of the found path, together with memory updating, and resetting to zero of registers 25 and 27. When there is no output on circuit 130 from gate 129, the junctor being examined (AB) is busy and it is necessary to go back to phase $P_2$ and to add one unit to B. This is done by the following circuits: A second branch 132 from circuit 130 including an inverter 133, permits an output on circuit 134 indicative of the condition "AB not free." A first branch 135 from circuit 134 conditions an AND gate 136, whose second input is circuit $P_3$, and the output circuit 137 from said gate 136 conditions the OR gate 126. A second branch 138 from circuit 134 conditions OR gate 111.

DETAILED DESCRIPTION OF A COMPLETE PATH FINDING PROCESS BETWEEN TWO SUBSCRIBERS OF RESPECTIVE ADDRESSES IJK AND I'J'K'

As soon as the telephone line scanning system (which is not being described since it does not form a part of the present invention) has detected the calling subscriber address IJK, and the called subscriber address I'J'K', the coordinates I, J, I' and J' of said addresses are entered respectively into registers 21, 22, 23 and 24, and search initiation circuit S is enabled. At that time, registers 25 and 27 both hold therein the value "0" and register 26 value "1."

Circuit $P_1$ is then excited, and also circuit $T_1$ upon the first clock pulse. The address IJ0 is transferred into register 29 and registers 31 then 78 hold then a "1" or a "0" according to whether lead IJ0 is free or busy.

Upon the next clock pulse, circuit $P_1$ is still excited because counter 32 has not been incremented and circuit $T_1$ is cut off and $T_2$ excited. Address I'J'1 is transferred into register 29, and registers 31 and subsequently 84 receive the binary status of lead I'J'1.

If one at least of leads IJ0 or I'J'1 is not free, gate 80 will stay disabled all throughout phase $P_1$ and at time $T_2$ of said phase, gate 92 will be enabled and an increment signal will be transferred into circuit 97, register 25 will then indicate "1" and register 26 "2" (binary number "10").

Since counter 32 has not received any increment, circuit $P_1$ will continue to provide an output and phase $P_1$ will be repeated during which phase the status of leads IJ1 and I'J'2 is going to be examined. Some number of successive phase $P_1$ will then be repeated until some value of A is reached, say $A_n$, such that leads $IJA_n$ and $I'J'(A_n+1)$ are both found free.

If after having tried all successive values of A, the last two leads of the set that is IJ11 and I'J'0 are not both free, detection by gate 106 of those simultaneous conditions "Add 1 to A" and "$A=11$" will cause an overflow and search end signal to be sent into circuit 107.

If on the contrary a suitable value $A_n$ is found, gate 80 is enabled and a signal is sent by circuits 86 and 87 to counter 32. Circuit $P_2$ is then excited to initiate phase $P_2$.

On the first clock pulse after $P_2$ excitation, circuit $T_1$ is excited, so that address $A_n$I0 is transferred into register 29. Register 31, then 78, will contain a "1" or a "0" according to whether lead $A_n$I0 is idle or busy.

On the following clock pulse, $P_2$ being still excited, $T_1$ is cutoff and $T_2$ excited. Address $(A+1)I'O$ is transferred into register 29. Register 84 will thereafter contain the binary status of lead $(A_n+1)I'0$.

If one at least of the two leads $A_n$I0 and $(A_n+1)I'0$ is not free, gate 80 will stay disabled all throughout phase $P_2$. At time $T_2$ of said phase gate 109 will be enabled, and an increment signal will then be sent via circuit 112 to register 27. Register 27 will then be set to "1."

Since counter 32 has received an increment order, circuit $P_2$ will go on being excited and a new phase $P_2$ will be repeated, during which phase, the status of leads $A_n$I1 and $(A_n+1)I'1$ will be examined.

After some number of successive phase $P_2$ a value of B, say $B_p$, may be found such that both leads $A_nIB_p$ and $(A_n+1)I'B_p$ are found free.

If after having tried all successive values of B, the last two leads of the set, that is $A_n$I3 and $(A_n+1)I'3$ are not both free, the detection by gate 122 of those simultaneous conditions "Add 1 to B" and $B=3$ will send to counter 32 (via circuits 123, 125, and 127) a signal ordering it to decrement by one, that is to go back to phase $P_1$ and on the other hand to command (via circuits 123, 124, 95 and 97) a one unit addition to register 25. It should be noted that register 27 is reset automatically by circuit 112 adding one unit to B. A new $P_1$ phase will then be initiated by examining those leads of the first set, starting from the new value of A that is $A_n+1$.

If on the contrary, a suitable value $B_p$ has been found, gate 80 is enabled at time $T_2$ of phase $P_2$, and an increment signal is then sent via circuits 86 and 87 to counter 32: circuit $P_3$ is then excited, such that a first phase $P_3$ is initiated.

As soon as $P_3$ is excited, the address $A_nB_p$ held in registers 25 and 27 is transferred into register 29. Binary status of junctor $A_nB_p$ will then show up in register 31:

If said status corresponds to a zero, that is junctor $A_nB_p$ not free, gate 129 stays disabled and the output circuit 134 from inverter 133 is excited. A signal is then sent into circuit 127 via gates 136 and 126 causing counter 32 to count down, and on the other hand into circuit 112 causing a one unit addition into register 27, via gate 111. A new $P_2$ phase is then initiated starting from values $A_nI(B_p+1)$ and $(A_n+1)I'(B_p+1)$ and so on; If said status corresponds to a "1," that is junctor $A_nB_p$ idle, gate 129 is enabled and an end of search signal is then sent into circuit 131. Junctor $A_nB_p$ then defines a free path between leads IJK and I′J′K′ such free path going through the following elements in succession:

Subscriber line IJK,
Matrix IJ of stage one,
Link $IJA_n$ (set $CL_{12}$),
Matrix $A_nI$ of stage two,
Link $A_nIB$ (set $CL_{23}$),
Matrix $A_nB_p$ of stage three,
Junctor $A_nB_p$,
Matrix $(A_n+1)B_p$ of stage three,
Link $(A_n+1)I'B_p$ (set $CL_{23}$),
Matrix $(A_n+1)I'$ of stage two,
Link $I'J'(A_n+1)$ (set $CL_{12}$),
Matrix I′J′ of stage one,
Subscriber line I′J′K′.

The switches to be closed in the enumerated matrices to establish the path so determined is via the connection law disclosed on FIG. 3, which is:

For matrix IJ of stage one, that switch of coordinate K(row) $A_n$ column);
For matrix $A_nI$ of stage two, that switch of coordinate $JB_p$;
For matrix $A_nB_p$ of stage three, that switch corresponding to the row lead of coordinate I and to the column lead coupled to junctor $A_nB_p$;
Junctor $A_nB_p$ itself;
For matrix $(A_n+1)B_p$ of stage three, that switch corresponding to the row lead of coordinate I′ and to the column lead coupled to junctor $A_nB_p$;
For matrix $(A_n+1)I'$ of stage two, that switch of coordinate $J'B_p$;
For matrix I′J′ of stage one, that switch of coordinate $K'(A_n+1)$.

At the end of a successful search, all of the coordinates I, J, I′, J′, $A_n$ and $B_p$ as well as $A_n+1$ are contained in registers 21, 22, 23, 24, 25, 26 and 27. The marking circuit addressing as well as memory updating may be readily effected from the output circuits from said register. After such operations have been accomplished, the subject registers are reset to zero (except for register 26 which then obviously hold a "1").

DESCRIPTION OF A PARTICULAR MEMORY ORGANIZATION FIG. 8

The storage of FIG. 8 is designed to meet the invention general requirements. Its main advantage is in providing automatic storage updating and simplifying the addressing of said storage.

In accordance with said implementation, a bistable magnetic core is made to thread each link and each junctor lead (a junctor lead being understood as that lead coupling two half-way stage matrices via a junctor). Each core will therefore be subject to field variations as a result of current through the corresponding lead. With parameters properly chosen (core characteristic, current flowing through the leads) the magnetic status of a core will reflect, at any time, the busy or nonbusy status of that lead with which said core is associated, and to "read" this status via two coincidence addressing circuits and a read out circuit. The addressing of the storage is from register 29 which sequentially receives the addresses of links to be examined.

In FIG. 8, there is shown schematically circuits for successively addressing from register 29:

(1) A link of given address *ija* from the first link set $CL_{12}$
(2) A link of given address *aib* from the second link set $CL_{23}$, and
(3) A junctor lead JR of given address *ab*;

Cores $W_{ija}$, $W_{aib}$ and $W_{ab}$ are respectively associated with these three leads.

As in the previous case, register 29 has been symbolically shown in three sections, *29a*, *29b*, and *29c*, corresponding to the three phases $P_1$, $P_2$ and $P_3$.

The nine output circuits from register 29 are divided into three branches 139, 140 and 141 comprising respectively:

Nine output circuits for the first branch 139,
Eight output circuits for the second branch,
Six output circuits, corresponding to the first six bit positions for the third branch.

The nine leads of branch 139 condition nine AND gates whose second input is circuit $P_1$. The connection leads to the drawing being generally shown under a single line connection. The nine gates have been shown under a single gate, labelled 142. The nine output circuits from gate 142, generally shown under 143, then divide into two groups 144 and 145 comprising respectively: five leads (corresponding to the first five register bit positions) and four leads (corresponding to the 6th, 7th, 8th and 9th bit positions of the register). The first group 144 excites a first decoder 146, and the second group a second decoder 147.

The decoder 146 includes twenty-four output leads each of them corresponding to one of the twenty-four binary numbers which may be formed by the first five bit positions of register 29. (It should be recalled that coordinate A may only take twelve distinct values out of the sixteen values permitted by the four bit positions said coordinate occupies.) Decoder 147 includes sixteen output leads, each of them corresponding to one of those sixteen binary numbers which may be formed by the last four bit positions of register 29. Each of said decoders may include a set of AND gates whose input comprises logic inverters divided in accordance with each combination desired. In FIG. 9 has been shown one of the gates of decoder 146 (one giving the combination "10110").

The output leads from decoders 146 and 147 corresponding to address *ija*, that is 148 and 149, respectively condition two AND gates 150 and 151 whose second input is circuit *t* which as was seen above delivers clock pulses. The gates are necessary because of the fact that the core addressing pulses must be shorter than those tarnsmitted by circuits 148 and 149 which actually correspond to those delivered by circuits $T_1$ and $T_2$. The respective output circuits 152 and 153 of gates 150 and 151 make up the addressing leads of core $W_{ija}$. Assuming that address *ija* is for example "100110110," output leads 148 and 149 respectively correspond to those AND gates of decoders 146 and 147 giving the combinations "10110" and "1001." Each of the remaining cores threaded through the links of the $CL_{12}$ set, may be associated with two addressing leads coming out of respective decoders 146 and 147. Since the outputs of said decoders allow $$24\times16=384$$

combinations, there are 384 leads.

The wiring is similar to that of a core matrix comprising twenty-four rows and sixteen columns. For example, lead 152 representing the combination "10110" will be common to all cores of the $CL_{12}$ link set, the first five address ranks of which hold that combination (that is twenty-four cores). Similarly lead 153 representing combination "1001" will be common to all cores of the $CL_{12}$ link set, the last four address ranks of which hold that combination (that is sixteen cores).

Besides being threaded by that link of address *ija* together with the two addressing leads, core $W_{ija}$ is further threaded by a read out lead R which is, as in all conventional storage, common to all of the storage cores, since one core is read at a time. The lead R is coupled to register 31 whose role is the same as in the previous example.

Branch 140 from register 29 (eight total) are divided, after going through the AND gates generally shown under 154 and controlled by circuit $P_2$, into two groups 155 and 156 of four leads each. Said two groups are respectively coupled to two decoders 157 and 158 comprising sixteen output leads for the first, and twelve for the second. Combined by two's, said output leads make up 192 pairs of leads to address those cores of the $CL_{23}$ link set. Said address leads through AND gates such as 159 and 160 controlled by circuit *t* for the same reasons as previously mentioned. In the fig. only core $W_{aib}$ addressing circuits have been shown.

Still in accordance with the same principle, those leads from branch 141 (six in total) are divided after going through those AND gates generally shown under 159 and controlled by circuit $P_3$, into two groups 160 and 161 of three leads each, corresponding to register 29 bit positions 1, 2, and 3 for the first group and 4, 5 and 6 for the second one. These two groups are coupled respectively to decoders 162 and 163 comprising eight output leads for the first and six for the second. Combined by two's, said leads make up 48 pairs of leads to address those cores of the junctor lead set. Said addressing leads go through gates such as 164 and 165 controlled by circuit *t*. In the fig. only the addressing circuits of core $W_{ab}$ have been disclosed.

The unit operation is as follows:

When an address IJA is set in register 29 at time $T_1$ of phase $P_1$, core $W_{IJA}$ is addressed via decoders 146 and 147 and read wire R sends into register 31 the status of link IJA;

At time $T_2$ of phase $P_1$, register 29 contains address $I'J'(A+1)$, and it will be core $W_{I'J'(A+1)}$ that will be addressed via decoders 146 and 147. Lead R sends the status of link $I'J'(A+1)$ into register 31 for processing;

At time $T_1$ of phase $P_2$, register 29 holds address AIB and core $W_{AIB}$ is addressed via decoders 157 and 158. The status of link AIB is transmitted to register 31 by lead R for processing;

At time $T_2$ of phase $P_2$, register 29 holds the address $(A+1)I'B$ and it is core $W_{(A+1)I'B}$ that will be addressed via decoders 157 and 158. The status of link $(A+1)I'B$ is transmited into register 31 via conductor R for processing;

At phase $P_3$, register 29 holds address AB and core $W_{AB}$ is addressed via decoders 162 and 163. The status of junctor lead AB is transmitted to register 31 via lead R for processing.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for determining a free connective path between a plurality of matrices in a network of a plurality of stages of matrices in which each matrix includes elements for selectively establishing a connective path to other matrices including:

an address register containing a plurality of orders for storage of data indicative of a path between a plurality of matrices;

means for initially setting into the lower orders of said address storage register, the matrix designation of said plurality of matrices between which a path is required and in all other orders the designation of matrices to complete a tentative path;

sensing means responsive to the address data contained in said storage register for selectively detecting the free or busy connection between connected matrices defined by said data and providing an indication thereof;

phase generating means to control the readout of successive orders of said address register to said sensing means in response to the free condition of the connective link referrable to the order then being considered to verify the tentative path or to initiate a modification in the path so indicated;

means responsive to an output from said sensing means that a link between matrices is busy to modify the matrix designation contained in the order of said address register then being considered and controlling said phase generating means to iterate the step of immediately above;

and means responsive to an indication from said address register that all matrices referrable to that order have been considered to control said phase generative means to regress to a lower order to establish a different path than the one originally assumed correct.

2. The apparatus of claim 1 wherein said generating means includes a bidirectional counting device responsive to the output of said sensing device indicative of a free path between matrices being considered for incrementing to a successive phase; said counting device being responsive to the output of said sensing device indicative of a busy path and an output from said address register that all matrix connections referrable to the order being considered have been considered for decrementing said counting device to initiate the previous phase.

3. The apparatus of claim 2 wherein said sensing means includes a magnetic core associated with each link between matrices selectable by said address contained in said address register and a sense winding contained in each said core and responsive to the selection process for providing an indication of the state of said core and consequently the condition of said link.

4. Apparatus for determining a free connective path between two matrices referrable to subscribers connected immediately thereto in a switching network including a plurality of stages of matrices in which each matrix includes elements for selectively establishing a connective path to another matric including:

an address register containing a plurality of orders for storage of data indicative of the path between the subscriber matrices;

means for initially setting into the lowest orders of said address register the matrix designation of the subscriber matrices and in all other orders designations of matrices and connective elements by matrix designation to complete a tentative path between the subscriber matrices;

sensing means responsive to the address data contained in said storage register for selectively detecting the free or busy connection between the connected matrices and links defined by said data and providing an indication thereof;

phase generating means to generate time signals to establish successive circuit conditions within said apparatus wherein the links between successive matrices may be tested;

means forming part of said sensing means and responsive to the incrementing time signals to enable the selective transfer of data by successively higher order from said address register to said sensing means;

first control means responsive to the output of said sensing means indicative that both links then being considered are free for advancing the phase generating means to the next phase;

second control means responsive to the output of said sensing means indicative that either link is busy for modifying the matrix designation of the order of said address register then being considered to ascertain whether the linking so defined are free and third control means responsive to an indication from said address register that all matrices referrable to that order have been considered to decrement said phase generator to establish a different path from that found free in a lower order and assumed correct as a portion of the entire path.

5. The apparatus of claim 4 wherein said sensing means includes a magnetic core associated with each link between matrices selectable by said address register, and a sense winding contained in each said core and responsive to the selection process for providing an indication of the state of said core and consequently the condition of said link.

References Cited

UNITED STATES PATENTS

| | | | |
|---|---|---|---|
| 3,300,764 | 1/1967 | Doelz et al | 340—172.5 |
| 3,287,703 | 11/1966 | Slotnick | 340—172.5 |
| 3,287,702 | 11/1966 | Borck et al. | 340—172.5 |
| 3,273,126 | 9/1966 | Owen et al. | 340—172.5 |
| 3,241,124 | 3/1966 | Newhouse | 340—172.5 |

GARETH D. SHAW, Primary Examiner